(12) United States Patent
Han et al.

(10) Patent No.: US 11,341,650 B2
(45) Date of Patent: May 24, 2022

(54) METHOD FOR ACCELERATING THREE-DIMENSIONAL OBJECT SEGMENTATION WITH POINT CLOUD SIMPLIFICATIONS

(71) Applicant: AT&T Intellectual Property I, L.P., Atlanta, GA (US)

(72) Inventors: Bo Han, Bridgewater, NJ (US); Cheuk Yiu Ip, Metuchen, NJ (US); Eric Zavesky, Austin, TX (US); Huanle Zhang, Davis, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 99 days.

(21) Appl. No.: 16/824,023

(22) Filed: Mar. 19, 2020

(65) Prior Publication Data

US 2021/0295522 A1    Sep. 23, 2021

(51) Int. Cl.
| | |
|---|---|
| *G06T 7/11* | (2017.01) |
| *G06K 9/62* | (2022.01) |
| *G06T 1/60* | (2006.01) |
| *G06N 3/08* | (2006.01) |
| *G06T 3/40* | (2006.01) |

(52) U.S. Cl.
CPC .............. *G06T 7/11* (2017.01); *G06K 9/6257* (2013.01); *G06N 3/08* (2013.01); *G06T 1/60* (2013.01); *G06T 3/40* (2013.01); *G06T 2207/10028* (2013.01); *G06T 2207/20081* (2013.01); *G06T 2207/20084* (2013.01)

(58) Field of Classification Search
CPC ..... G06T 7/11; G06T 1/60; G06T 3/40; G06T 2207/10028; G06T 2207/20081; G06T 2207/20084; G06K 9/6257; G06N 3/08
See application file for complete search history.

(56) References Cited

U.S. PATENT DOCUMENTS

| | | | | |
|---|---|---|---|---|
| 9,633,483 | B1 * | 4/2017 | Xu | G06T 17/10 |
| 10,262,243 | B2 * | 4/2019 | Lim | G06K 9/6215 |
| 10,303,711 | B2 * | 5/2019 | Frank | G06F 16/358 |
| 10,474,161 | B2 * | 11/2019 | Huang | G06K 9/6289 |
| 11,004,202 | B2 * | 5/2021 | Tchapmi | G06K 9/6271 |
| 11,022,693 | B1 * | 6/2021 | Allais | G01S 7/4808 |

(Continued)

OTHER PUBLICATIONS

Cicek, Ozgun et al., "3D U-Net: Learning Dense Volumetric Segmentation from Sparse Annotation", arXiv:1606.06650 [cs.CV]., 2016, 8 pages.

(Continued)

*Primary Examiner* — Gregory M Desire
(74) *Attorney, Agent, or Firm* — Guntin & Gust, PLC; Mark Wilinski

(57) ABSTRACT

Aspects of the subject disclosure may include, for example, a device that has a processing system including a processor; and a memory that stores executable instructions that, when executed by the processing system, facilitate performance of operations, including downsampling a full point cloud to obtain a downsampled point cloud, wherein the downsampling reduces a data size of the full point cloud; and using a machine-learning model to assign labels for segmentation and object identification to points in the downsampled point cloud, wherein the machine-learning model is trained on the full point cloud. Other embodiments are disclosed.

20 Claims, 13 Drawing Sheets

(56) References Cited

U.S. PATENT DOCUMENTS

| | | | |
|---|---|---|---|
| 11,023,730 B1* | 6/2021 | Zhou | G06K 9/6256 |
| 2013/0051658 A1* | 2/2013 | Hwang | G06T 7/187 |
| | | | 382/154 |
| 2019/0156206 A1* | 5/2019 | Graham | G06N 3/0454 |

OTHER PUBLICATIONS

Dai, Angela et al., "ScanNet: Richly-annotated 3D Reconstructions of Indoor Scenes", In Proceedings of the IEEE Computer Vision and Pattern Recognition (CVPR), 12 pp., 2017, 5828-5839.

Graham, B. et al., "3D Semantic Segmentation with Submanifold Sparse Convolutional Networks", In Proceedings of the IEEE Computer Vision and Pattern Recognition (CVPR), 9 pp., 2018, 9224-9232.

Graham, B. et al., "Submanifold Sparse Convolutional Networks", arXiv e-prints asXiv:1706.01307, 10 pp., 2017.

Pauly, M. et al., "Efficient Simplification of Point-Sampled Surfaces", In Proceedings of the IEEE International Conference on Visualization (VIS), 8 pp., 2002.

\* cited by examiner

FIG. 2H

| Model | m | block_style | optional_block | FLOPs | Memory (GB) | Time (s) | IOU (%) |
|---|---|---|---|---|---|---|---|
| 1 | 8 | VGG | False | $2.50 \times 10^9$ | 0.61 | 0.63 | 63.29 |
| 2 | 8 | VGG | True | $4.15 \times 10^9$ | 0.71 | 0.78 | 65.15 |
| 3 | 8 | ResNet | True | $7.44 \times 10^9$ | 1.04 | 1.13 | 68.52 |
| 4 | 16 | VGG | False | $1.03 \times 10^{10}$ | 0.86 | 0.87 | 67.11 |
| 5 | 16 | VGG | True | $1.66 \times 10^{10}$ | 1.10 | 1.16 | 68.79 |
| 6 | 16 | ResNet | True | $2.97 \times 10^{10}$ | 1.82 | 1.81 | 69.79 |

FIG. 2I

| IOU (%) | Model | Simplification | Time | Reduction |
|---|---|---|---|---|
| 60 | 2 | Random 40% | 0.39s | 38.10% |
| 61 | 2 | Random 44% | 0.42s | 33.33% |
| 62 | 4 | Random 40% | 0.46s | 26.98% |
| 63 | 4 | Random 44% | 0.48s | 23.98% |
| 64 | 4 | Random 48% | 0.52s | 33.33% |
| 65 | 4 | Random 56% | 0.59s | 24.36% |
| 66 | 4 | Grid 50% | 0.63s | 27.59% |
| 67 | 4 | Grid 55% | 0.70s | 19.54% |
| 68 | 3 | Random 64% | 0.78s | 30.00% |
| 69 | 3 | Grid 60% | 0.95s | 47.51% |
| 70 | 6 | Grid 63% | 1.45s | ∞ |

FIG. 2J

| IOU (%) | Model | Simplification | Memory | Reduction |
|---|---|---|---|---|
| 60 | 2 | Grid 32% | 0.39GB | 38.07% |
| 61 | 2 | Grid 37% | 0.41GB | 32.7% |
| 62 | 2 | Grid 37% | 0.41GB | 32.7% |
| 63 | 2 | Grid 45% | 0.45GB | 26.23% |
| 64 | 2 | Grid 50% | 0.48GB | 32.5% |
| 65 | 2 | Grid 63% | 0.55GB | 25.35% |
| 66 | 4 | Grid 50% | 0.62GB | 27.91% |
| 67 | 4 | Grid 55% | 0.65GB | 24.42% |
| 68 | 6 | Grid 50% | 0.77GB | 25.96% |
| 69 | 6 | Grid 60% | 0.94GB | 53.95% |
| 70 | 6 | Grid 63% | 1.53GB | ∞ |

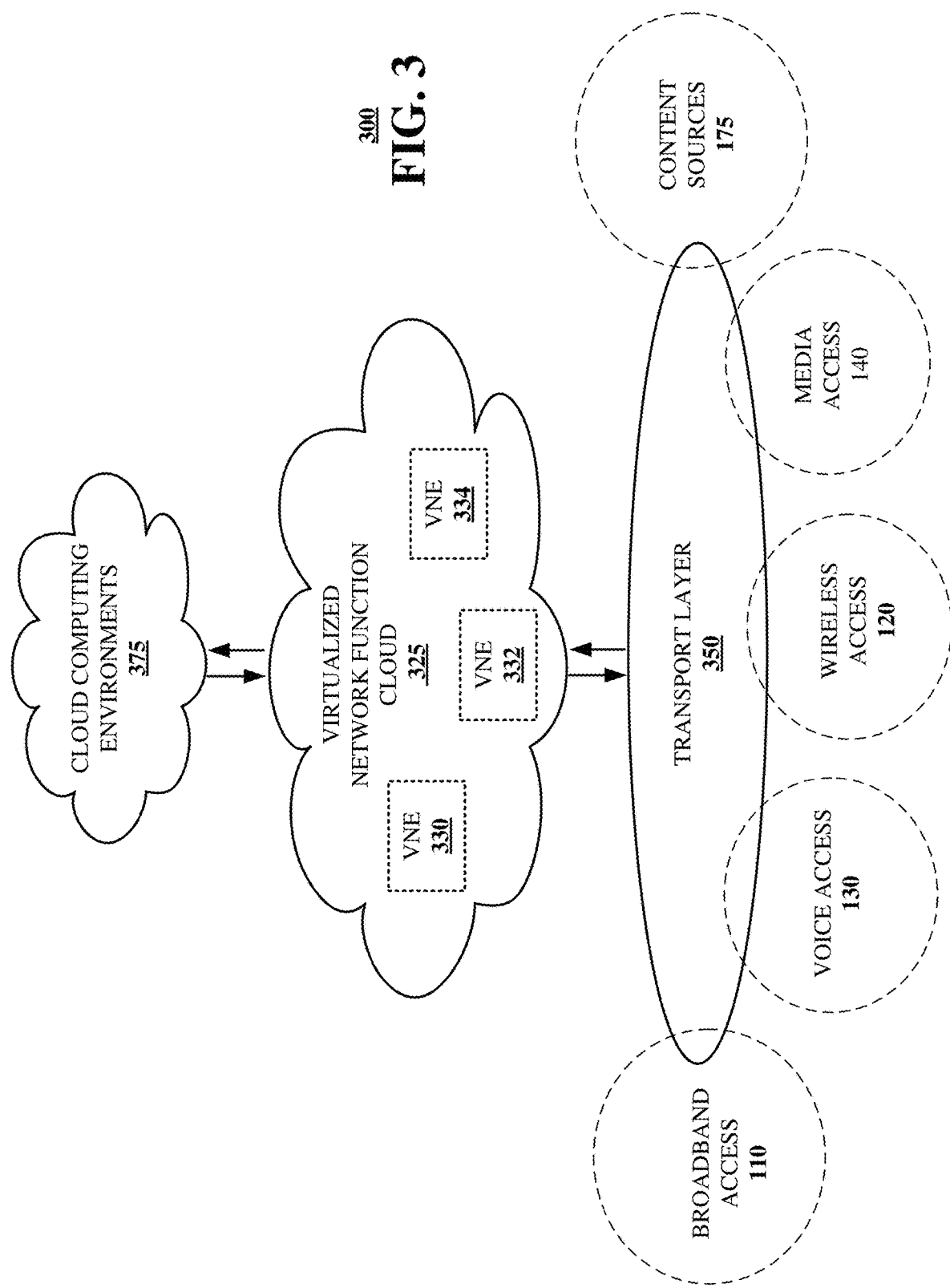

600

METHOD FOR ACCELERATING THREE-DIMENSIONAL OBJECT SEGMENTATION WITH POINT CLOUD SIMPLIFICATIONS

FIELD OF THE DISCLOSURE

The subject disclosure relates to a method for accelerating three-dimensional (3D) object segmentation with point cloud simplifications.

BACKGROUND

Machine-learning (ML) deep neural networks (DNNs) can be used to identify objects in images, i.e., object category segmentation. In segmentation, each pixel in an image is labeled as being part of a given object (foreground) or not (background). DNNs are usually trained with simple loss functions (e.g., softmax loss). A standard performance measure of accuracy that is commonly used for the object category segmentation problem is known as an Intersection-over-union (IoU). Given an image, the IoU measure provides a similarity between the predicted region and the ground-truth region for an object present in the image and is defined as the size of the intersection divided by the union of the two regions.

BRIEF DESCRIPTION OF THE DRAWINGS

Reference will now be made to the accompanying drawings, which are not necessarily drawn to scale, and wherein:

FIG. 2H is a table that illustrates six training models for 3D object segmentation.

FIG. 2I is a table that illustrates a method that greatly reduces the system running time for a given segmentation accuracy requirement.

FIG. 2J is a table that illustrates a method that greatly reduces a memory footprint for a given segmentation accuracy requirement.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for a machine-learning (ML) model and downsampling technique for segmenting a point cloud. Other embodiments are described in the subject disclosure.

One or more aspects of the subject disclosure include a device that has a processing system including a processor; and a memory that stores executable instructions that, when executed by the processing system, facilitate performance of operations, including downsampling a full point cloud to obtain a downsampled point cloud, wherein the downsampling reduces a data size of the full point cloud; and using a machine-learning model to assign labels for segmentation and object identification to points in the downsampled point cloud, wherein the machine-learning model is trained on the full point cloud.

One or more aspects of the subject disclosure include a machine-readable medium, comprising executable instructions that, when executed by a processing system including a processor, facilitate performance of operations, including: receiving a machine-learning model trained on a full point cloud; downsampling the full point cloud to a downsampled point cloud using a downsampling technique; and segmenting the downsampled point cloud using the machine-learning model to assign labels to points in the downsampled point cloud.

One or more aspects of the subject disclosure include a method of: downsampling, by a processing system including a processor, a full point cloud to a downsampled point cloud using a downsampling technique; and segmenting, by the processing system, the downsampled point cloud using a submanifold sparse convolutional network to assign labels to points in the downsampled point cloud, wherein the downsampling either reduces a memory usage, reduces a computational overhead, improves accuracy, or a combination thereof.

Figure 1:
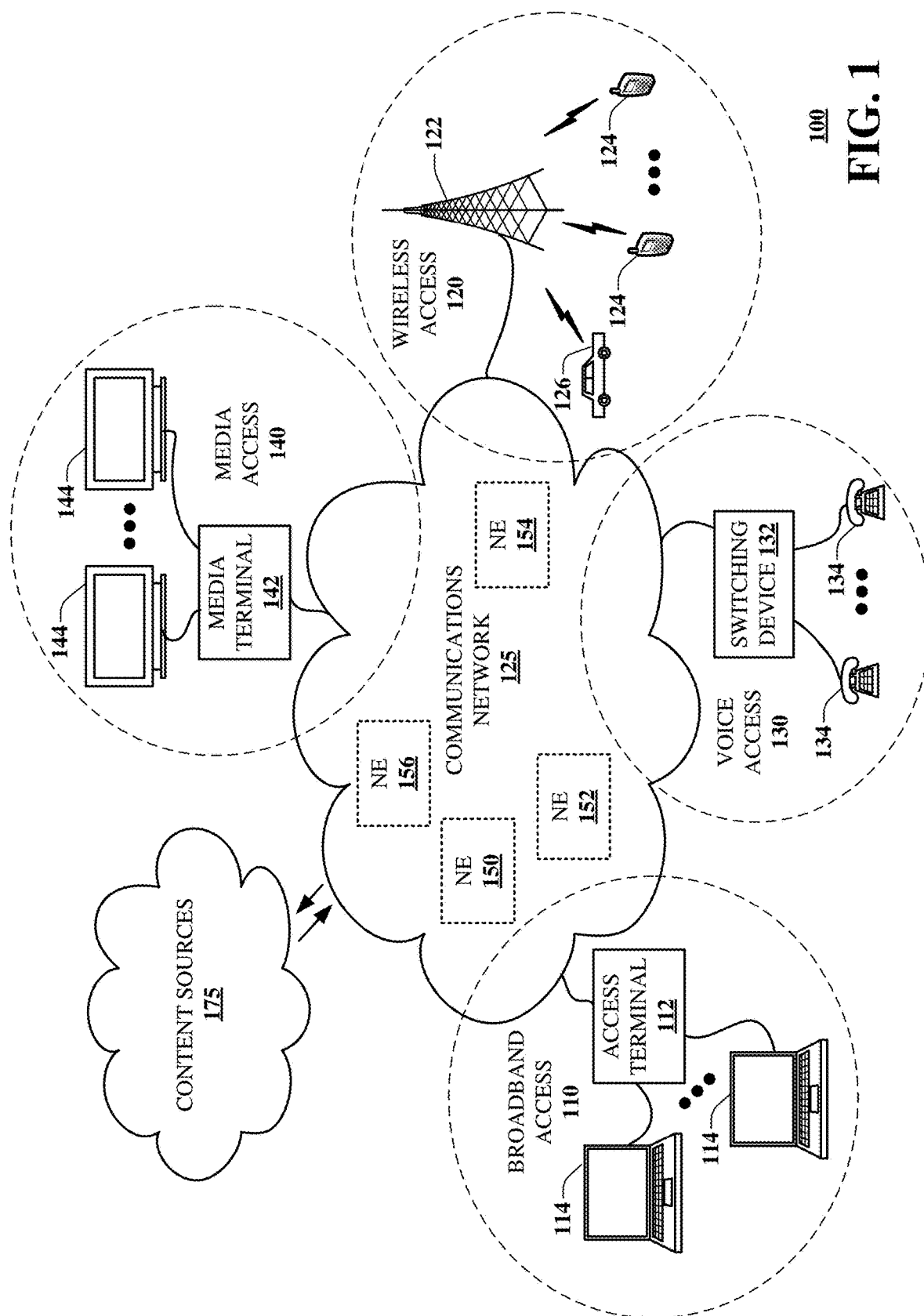
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part downsampling a point cloud and segmenting the downsampled point cloud using a machine-learning model. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The plurality of audio/video display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

ML networks can be used for segmentation and object identification purposes to label 3D media. ML network 3D object segmentation is computationally expensive and memory intensive, which hinders deployment in devices with low memory resources or applications with strict latency requirements. Point clouds and 3D mesh are two common data representations for modeling 3D objects in 3D media. Point clouds are gaining popularity because they are flexible, lightweight, and can be direct outputs from 3D scanners and augmented reality (AR) or mixed reality (MR) headsets. A point cloud is an unordered set of points. Each point has location information (X, Y, Z) and a property P. For different applications, P has different formats, such as null (empty) in ShapeNet part-segmentation datasets, a reflectance value I in KITTI autonomous driving datasets, and color (R, G, B) in ScanNet indoor semantic segmentation datasets. Point clouds have different characteristics from other vision sources such as images and videos.

Figure 2B:
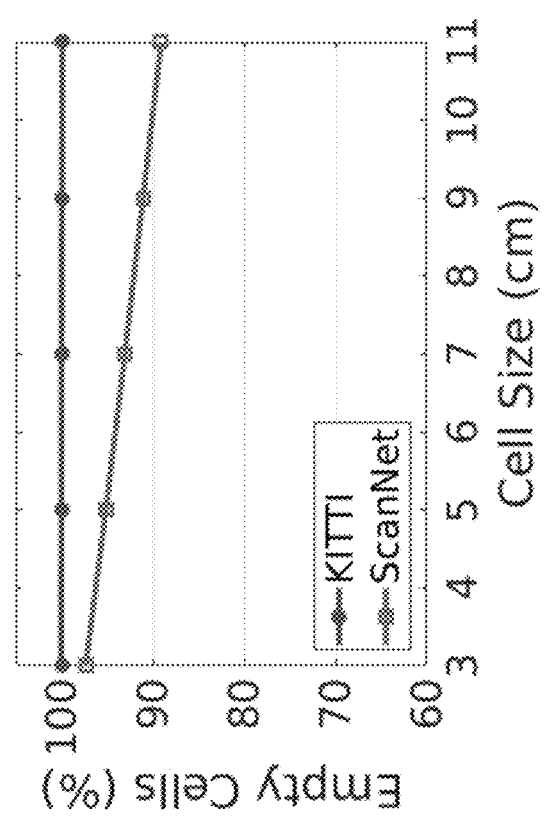
FIG. 2B is a block diagram demonstrating the independence of points in a point cloud, by illustrating different operations on a point in the cloud.
Figure 2A:
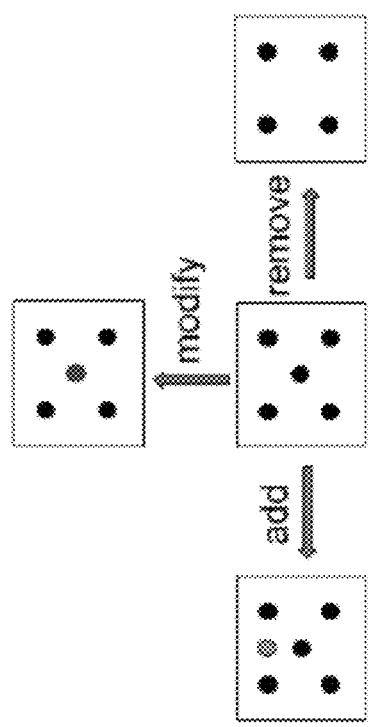
FIG. 2A is a graph illustrating a percentage of empty cells when a point cloud is created using different cell sizes.

In a first difference, point clouds are highly sparse, while images and videos are relatively dense. FIG. 2A is a graph illustrating a percentage of empty cells when a point cloud is created using different cell sizes. As shown in FIG. 2A, most of the cells are empty even when a large cell size is used. On the other hand, during voxelization, increasing cell sizes degrades data granularity as adjacent points are merged/dropped. Therefore, the voxelized representation of point clouds leads to severe computation and memory waste.

In a second difference from images, videos and other representations, points in a point cloud are location independent. FIG. 2B is a block diagram demonstrating the independence of points in a point cloud, by illustrating different operations on a point in the cloud. In contrast, vertexes (points) in a 3D mesh representation are connected by edges. Similarly, images and videos comprise pixels (points) that are location dependent. The independence of points in point clouds provides a freedom of data processing that has been largely ignored by the machine-learning community. For example, as shown in FIG. 2B, points can be removed, added, or modified while exploring how a pre-trained deep neural network (DNN) model interacts with the adjusted point cloud.

Due to the sparsity of point clouds, a DNN model that does not require all regularized input points of point clouds can save a massive amount of memory and computation overhead. Traditional DNN models for 3D point cloud segmentation requires a voxelization of inputs into grid cells and then generating a feature vector for each grid cell. These models result in overwhelming memory footprints and computation overhead because memory and computations are wasted on empty grid cells. A ML model with sparse convolutional layers is designed specifically for sparse data such as point clouds, which aims to replace conventional dense convolution layers. In sparse convolutional layers, a "site" is only activated when the "sites" of the reception field in the previous layer are active. In comparison, all sites in conventional convolutional layers are active, and thus they require much larger computation and memory consumption than sparse convolutional layers. Nonetheless, sparse convolutional neural networks have an active site dilation problem in which the number of activated sites increases layer by layer, and thus they are not as effective for deep layers as for shallow layers. Submanifold sparse convolutional networks (SSCN) were proposed to solve this dilation problem. See Graham, et al., 3D Semantic Segmentation with Submanifold Sparse Convolutional Networks, in Proceedings of the IEEE Computer Vision and Pattern Recognition (CVPR 2018), which is incorporated by reference herein. The term 'submanifold' refers to input data that is sparse because the input data has a lower effective dimension than the space in which the data is found. For example, a one-dimensional curve in a 2+ dimensional space, or a two-dimensional surface in a 3+ dimensional space. In SSCNs, the active sites remain the same across the whole network, which in turn have the same number as the input layer, i.e., the number of points from the point cloud that are inputs to the SSCN. SSCNs have the merits of easy-training and high accuracy.

Figure 2C:
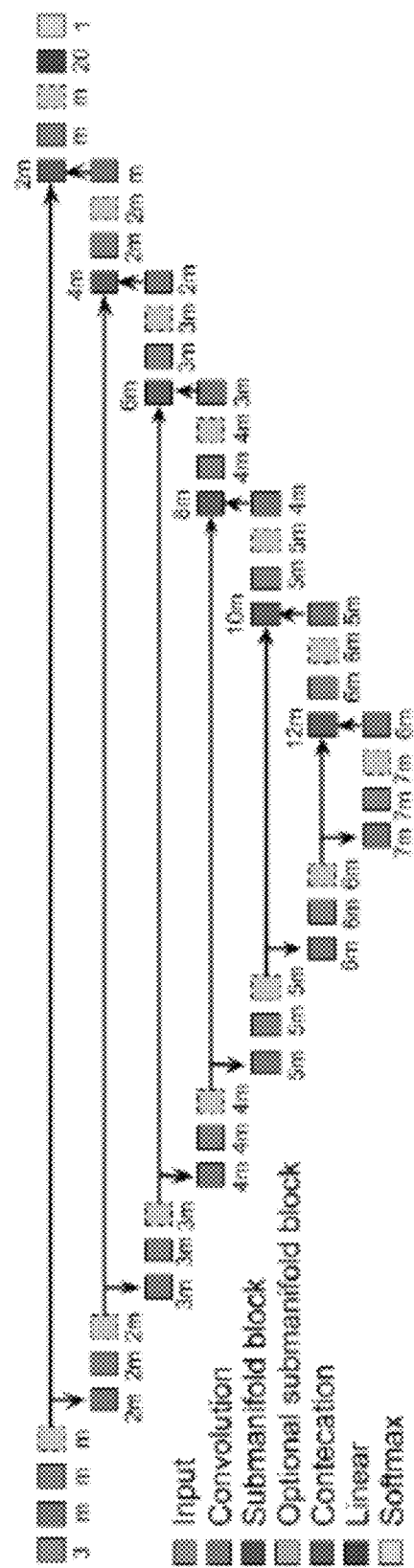
FIG. 2C is a block diagram of an embodiment demonstrating a submanifold sparse convolutional network machine-learning model structure in accordance with various aspects described herein.

FIG. 2C is a block diagram of an embodiment demonstrating a submanifold sparse convolutional network machine-learning model structure in accordance with various aspects described herein. In an embodiment, the system uses a SSCN model based on a U-Net SSCN. This model structure achieves high accuracy for 3D segmentation tasks. The number of feature planes is shown on top or bottom of each layer. Three parameters for the ML model can be adjusted, including: (1) the number of feature planes for each layer (m); (2) the style of the submanifold block (either VGG or ResNet) and (3) whether to use optional submanifold blocks. In another embodiment, an autoencoder modeling framework could be utilized instead of a U-Net topology. While the architecture (not shown here) of each layer maybe different, the desired result—learning a dense subspace representation—is similar across the two model types.

In an embodiment, a ScanNet 3D semantic segmentation database is used for training the model. The database is split into 1201 point clouds for training and 312 point clouds for validation. Each point is classified into 20 classes. The models are trained with the full size of point clouds from the training database, and then the models are evaluated with simplified point clouds from the validation dataset. The validation point cloud has an average of 158.8K points.

In an embodiment, a training experiment has a hardware embodiment that is run on a Dell Alienware laptop comprising six (6) 2.9 GHz processors. In the hardware embodiment, a model trained with the configurations of 32 feature planes for each layer, a submanifold block style=ResNet, and optional block=True for evaluation of point clouds. The model has 7.5M trainable parameters. To reduce the number of points in each point cloud, a fraction of points in the cloud were randomly sampled. The trained model was validated with the resultant randomly sampled point clouds. The model is trained with an original training dataset and validated with the simplified point clouds. The probability of keeping each point is changed, which generates simplified point clouds of different sizes.

Figure 2D:
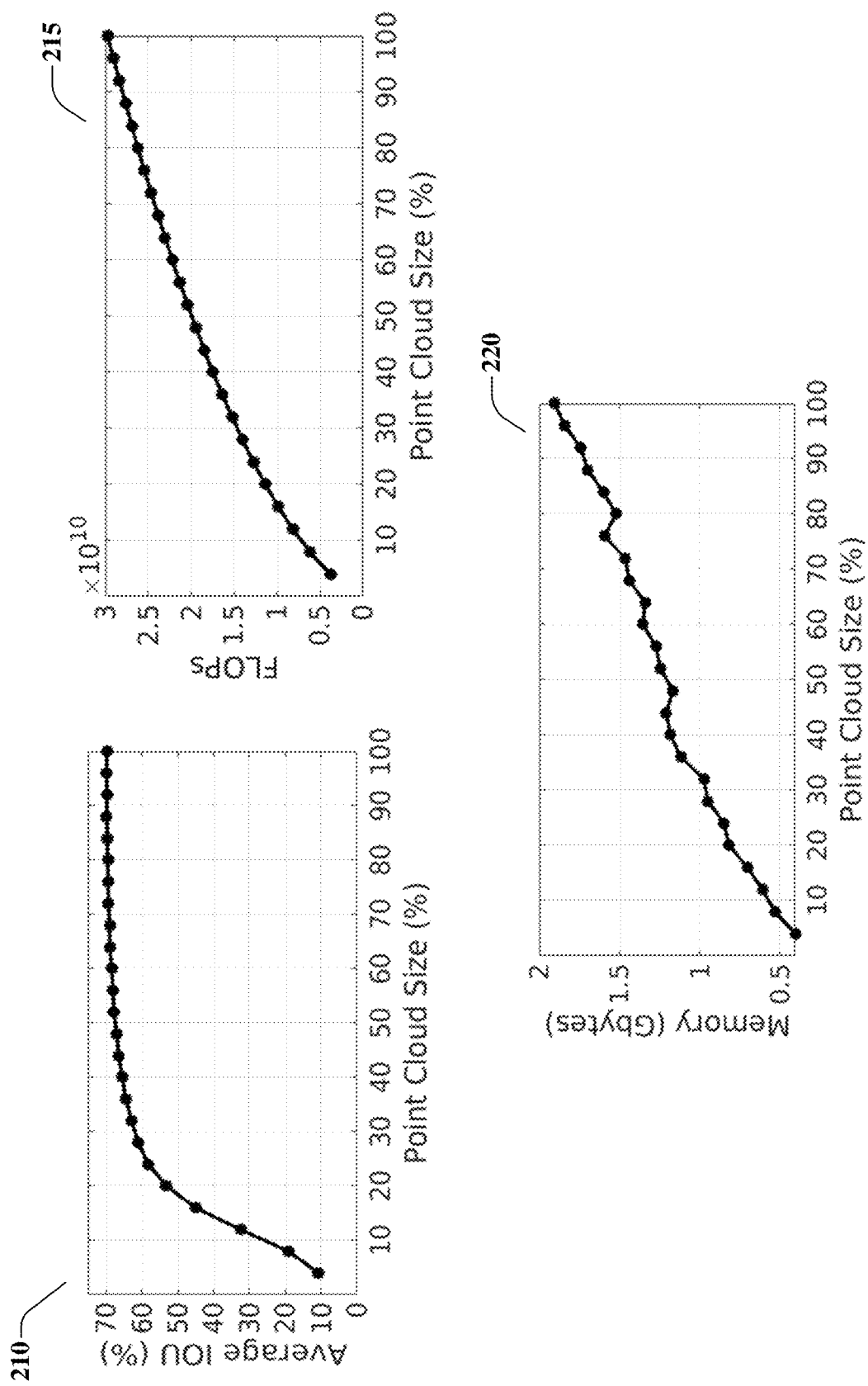
FIG. 2D is a series of graphs illustrating model performance with regards to accuracy, computation overhead, and memory overhead using different sizes of point clouds downsampled with a random simplification downsampling technique.

FIG. 2D is a series of graphs illustrating model performance with regards to accuracy, computation overhead, and memory overhead using different sizes of point clouds downsampled with a random simplification downsampling technique. The downsampling technique reduces a data size of the full point cloud. The performance at 100% point cloud size represents the model performance without data simplification, i.e., the trained model using the full point clouds has the average accuracy of 69.79% intersection-over-union (IoU), a number of multiplication and addition floating point operations (FLOPs) of $2.97 \times 10^{10}$, and a memory consumption of 1.82 GB per point cloud.

As illustrated in the model performance 210 graph of FIG. 2D, the average accuracy remains unchanged, even when only about a 60% downsampling reduction percentage of the points in the full point cloud are used. The performance slightly decreases from 69.79% to 60% IoU when point clouds are reduced to 25% of the original size. The results indicate that real-world point clouds are highly redundant for the task of segmentation. The accuracy plummets when point clouds are simplified too much, i.e., smaller than 20% of the original size.

As illustrated in the computational overhead 215 graph of FIG. 2D, the number of FLOPs is linearly correlated with the point cloud size. E.g., the smaller the point cloud's size, the less computation overhead that the model has. A 50% point cloud takes about ⅔ of the FLOPs of a full point cloud. Hence, the size of the point cloud should be reduced as much as possible without sacrificing accuracy.

As illustrated in the memory overhead 220 graph of FIG. 2D, memory overhead is also mostly linearly correlated with the point cloud size. A smaller point cloud leads to a better memory profile. As can be seen on the graph, a 50% point cloud takes about 63.27% in this embodiment.

To be sure, data simplification improves system performance. Data simplification can significantly reduce computational and memory overhead while meeting a required segmentation accuracy. The point cloud's size should be reduced as small as possible so long as the required segmentation accuracy is maintained. Different downsampling techniques generate point clouds with different characteristics, and thus the choice can affect model performance. Three types of point cloud data downsampling techniques are considered: random simplification, grid simplification, and hierarchy simplification. In random simplification, each point is independently kept with a given probability. Therefore, random simplification regards each point equally. In grid simplification, the point cloud is partitioned into grid cells of a given size. For each nonempty grid cell, a point is randomly selected among all the points in that cell. Therefore, grid simplification favors sparse points. This is because only one point is kept no matter whether the grid cell is sparse (i.e., a couple of points) or dense (i.e., a lot of points). The grid size is changed until the grid simplification generates point clouds of the same size as the random simplification. Hierarchy simplification provides an adaptive simplification of the point set through local clusters, which recursively splits the point set into smaller clusters, until the clusters have less than a given cluster size. Hierarchy simplification favors edge points rather than surface points and thus generates sharp and vivid point clouds. The cluster size is changed until the hierarchy simplification generates point clouds of the same size as the random simplification.

Figure 2E:
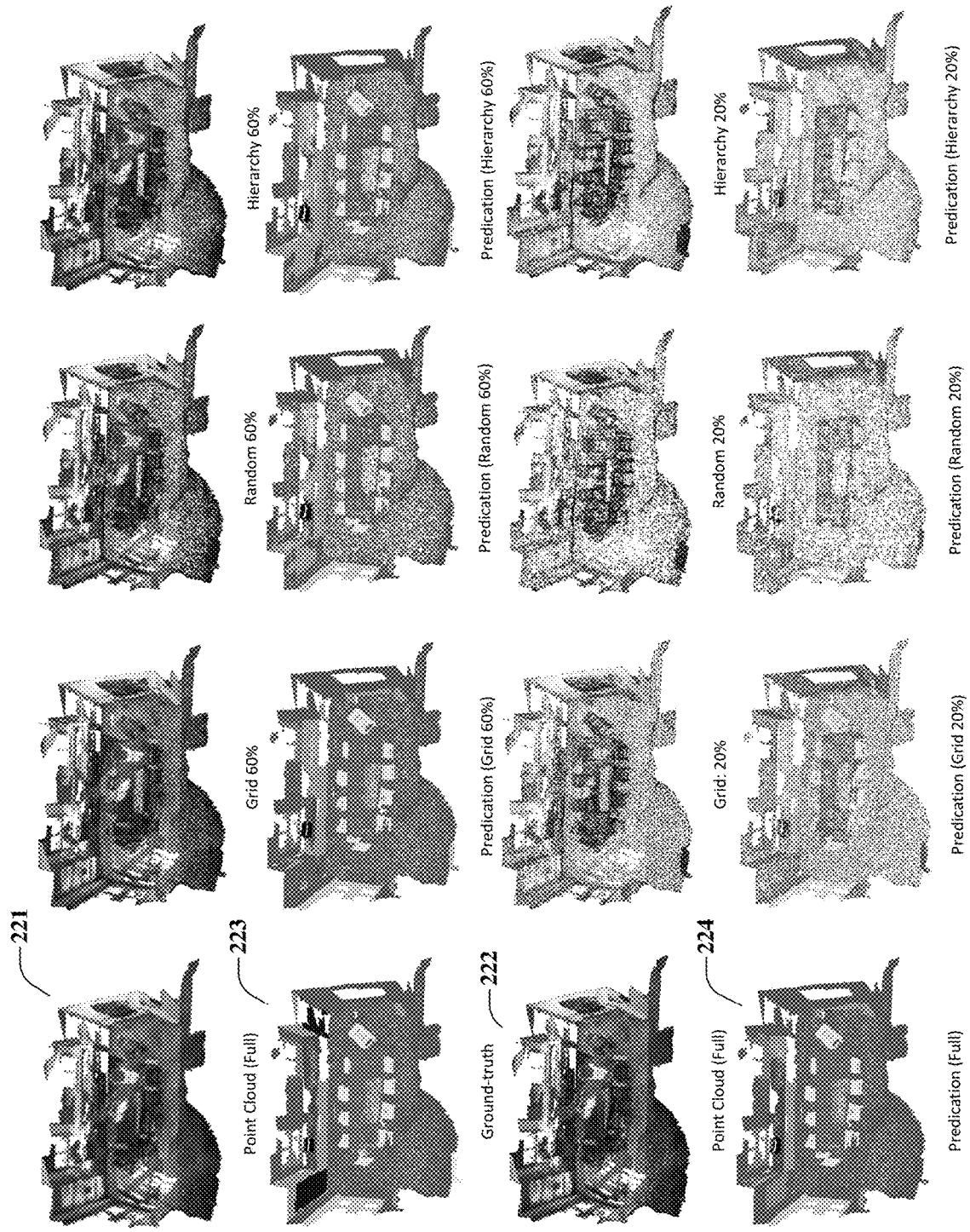
FIG. 2E is a diagram of images that illustrate different downsampling techniques and segmentation results from a trained machine-learning model.

FIG. 2E is a diagram of images that illustrate different downsampling techniques and segmentation results from a trained machine-learning model. As shown in FIG. 2E, images 221 and image 222 are a full-size point cloud. Image 223 is the ground-truth for the segmentation, and image 224 is the model segmentation results with the full-size point cloud. The model output for the simplified point clouds is shown in a predication row below the simplified point cloud input to the model. As can be observed from the bottom two rows, the model can detect objects such as the chairs (depicted in yellow) and the dining table (depicted in pink), despite using point clouds simplified as small as 20% of full-size point clouds.

Figure 2F:
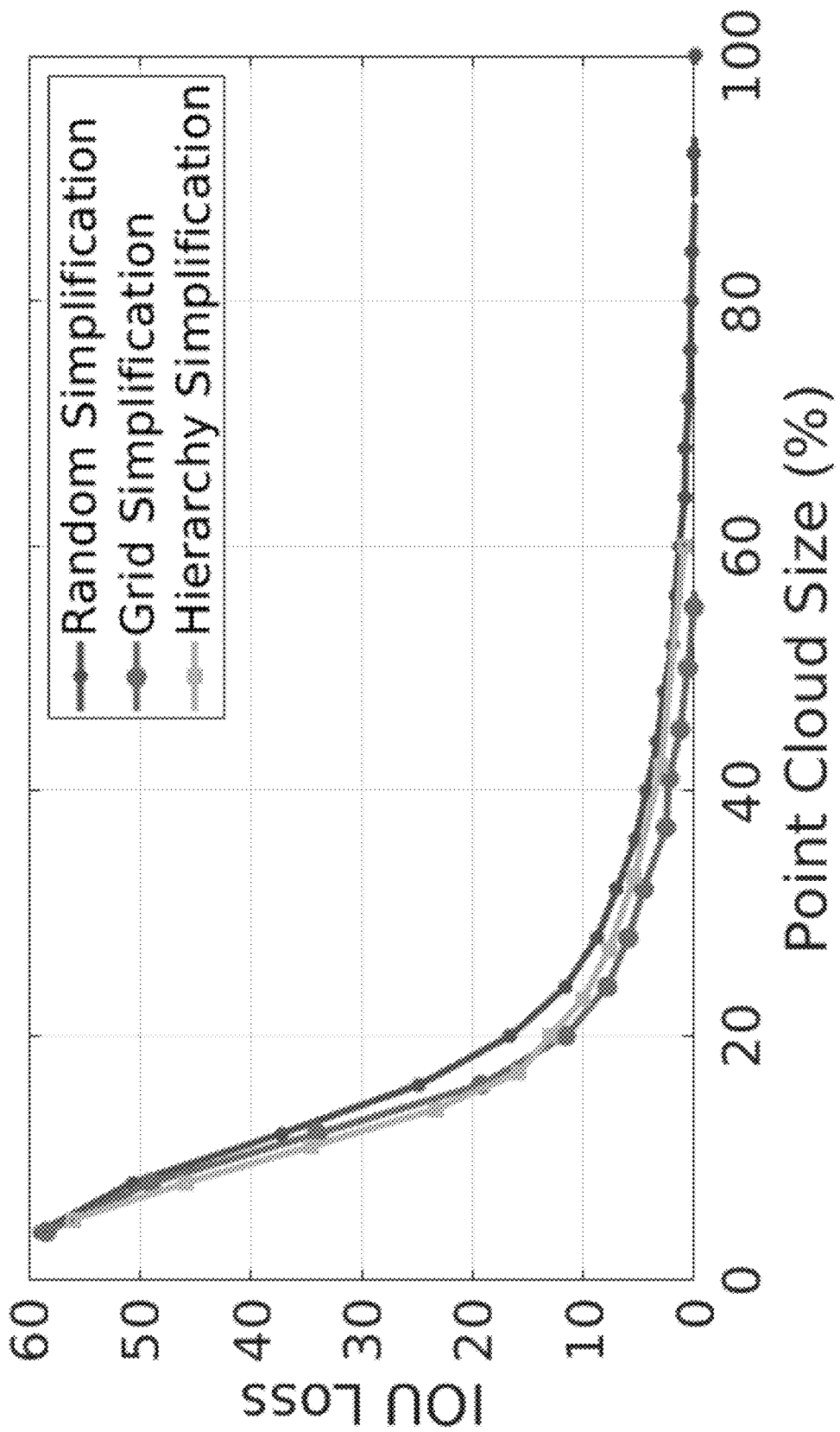
FIG. 2F is a graph illustrating the IoU loss of a model evaluating point clouds that are reduced by random simplification, grid simplification, and hierarchy simplification.

FIG. 2F is a graph illustrating the IoU loss of a model evaluating point clouds that are reduced by random simplification, grid simplification, and hierarchy simplification. As shown in FIG. 2F, (1) The IoU loss dramatically increases when the point clouds are reduced to smaller than 20% of the full size. (2) The grid and hierarchy simplifications have smaller IoU loss than the random simplification. (3) From 20% sizes and larger, grid simplification has the lowest loss and reaches zero loss with much smaller point clouds than the two other simplifications. It may seem counter-intuitive that the grid simplification works better than the hierarchy simplification, because the hierarchy simplification process produces more sharp and vivid point clouds than those simplified by grid simplification (cf, FIG. 2E, hierarchy 20% to grid 20%). Hence, the pre-trained model apparently "sees" differently from humans that place more emphasis on edges to discover objects, rather than surface to recognize and segment objects in an image.

In addition to reducing the computation and memory overhead, downsampling techniques can also improve model accuracy. In general, six models with different capabilities were trained by adjusting the hyperparameters including the number of feature planes for each layer; the style of the submanifold block; and whether to use the optional submanifold blocks. Random simplification and hierarchy simplification do not achieve higher accuracy than models using full point clouds, but the grid simplification achieves a higher accuracy than models using full point clouds. The results are consistent across the different models: the model accuracy with grid-simplified point clouds starts to surpass the model accuracy with full-size point clouds with point clouds downsampled to 60%. Because grid simplification generating a full point cloud (i.e., no simplification) would have a performance that equals the full-size point clouds, the model accuracy with grid simplified point clouds first increases, and then decreases to the model accuracy with full point clouds. The best IoU of grid simplification occurs between 63% to 87% of full-sized point clouds. Thus, a common belief that more points resulting in higher accuracy may be erroneous. In addition, the increase of IoU is not correlated with the model capabilities, which means that a very accurate model can also benefit from using grid simplification to improve the accuracy further. Grid simplification reduces computational overhead, memory overhead and can also slightly increase accuracy.

Figure 2G:
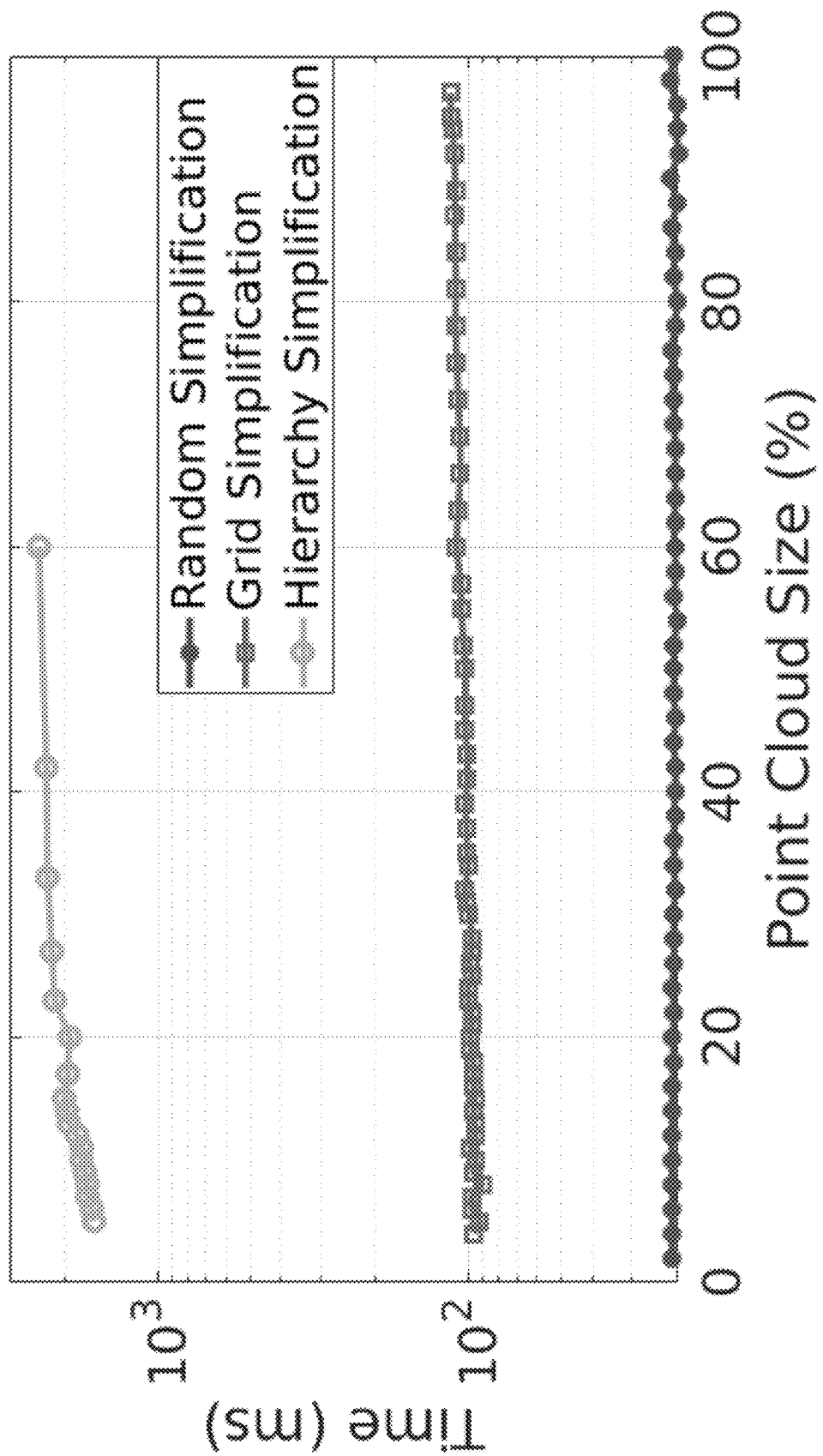
FIG. 2G is a graph illustrating the data processing time for various point cloud downsampling techniques and sizes.

FIG. 2G is a graph illustrating the data processing time for various point cloud downsampling techniques and sizes. Downsampling techniques greatly reduce the computation overhead of the model. On the other hand, downsampling involves extra data processing delay, which must be taken into consideration when determining overall system running time. FIG. 2G illustrates the data processing time for random simplification, grid simplification, and hierarchy simplification. As can be seen, the computational overhead for random simplification is not related to the point cloud size. Logically, this is because each point in a point cloud is independent. Random simplification takes about 21.82 ms to generate a simplified point cloud. Grid simplification takes a slightly longer time to generate bigger point clouds. Grid simplification takes 96.55 ms for 4% point clouds, which gradually increases to 114.26 ms for 97% point clouds. Hierarchy simplification takes much longer time than random simplification and grid simplification. Hierarchy simplification requires 1605.73 ms to generate 5% point clouds, which increases to 2414.56 ms for 60% point clouds.

FIG. 2H is a table that illustrates six training models for 3D object segmentation. The columns of the table comprise the model identification number and the parameters for each model. The parameters include (1) the number of feature planes for each layer, m; (2) the style of the submanifold block (either VGG or ResNet) and (3) whether to use the optional submanifold blocks (either True or False). The remaining columns comprise the FLOPs required to process a full point cloud, the memory required, the amount of system running time for the hardware embodiment described above, and the resultant performance segmentation accuracy (IoU %). Considering the model running time for full point clouds, the overall computational overhead of integrating a hierarchy simplification would increase, thereby degrading system running time, even with the reduced runtime of a downsampled point cloud as input.

FIG. 2I is a table that illustrates a method that greatly reduces the system running time for a given segmentation accuracy requirement. The table presents a combination of a model and a downsampling technique that results in the least overall running time for a given segmentation accuracy requirement. The combination is compared with the model that runs fastest, but without downsampling. As shown in FIG. 2I, most cases select random simplification over grid simplification because the processing time of random simplification is much less. However, when the extra processing time of grid simplification is compensated by less model running time (because of smaller point clouds), grid simplifications are preferred over random simplifications. Because all six trained models with full-size point clouds have IoU percentages lower than 70% but integrating grid simplification boosts the accuracy higher than 70%, the reduction for the 70% IoU target is 100%.

By integrating downsampling technique to simplify data input, the system can run very fast. In an embodiment for example, with a 60% IoU target, the system only takes 0.39 seconds by integrating model No. 2 with a 40% downsampled point cloud simplified by random simplification. With a 70% IoU target, the system takes 1.45 seconds by integrating model 6 with 63% downsampled point cloud simplified by grid simplification, all while running on the laptop CPU described above.

FIG. 2J is a table that illustrates a method that greatly reduces a memory footprint for a given segmentation accuracy requirement. Since data simplification needs much less memory than running models, the downsampling technique that results in the smallest point cloud has the best memory footprint, thus determining memory-sized limited models. For each given segmentation accuracy requirement, a combination of the model and the downsampling technique that results in the least memory can be compared with the most memory-friendly model without data simplification. Therefore, grid simplification wins over random simplification and hierarchy simplification. By integrating the grid simplification, the resultant system requires small memories. For example, for the 60% IoU target, the system only needs 0.39 GB memory by integrating model 2 with 32% downsampled point clouds; for the 70% IoU, the system needs 1.53 GB memory by integrating model 6 with 63% downsampled point clouds. These results signify that data simplification is an effective technique to accelerate models.

In an embodiment, drones are used to capture pictures of cell towers to reduce the cost of cell tower inspection. Traditionally, two-dimensional (2D) object detection is used to detect possible malfunctioning parts. However, 2D object detection cannot give detailed information about the objects' positions and orientations. Hence, it would be difficult to know whether the antennas are aligned from such image analysis. However, with 3D object segmentation, the detailed positions and orientations can be solved on a laptop used in the field, such as the hardware embodiment described above, which can easily solve this problem.

Figure 2K:
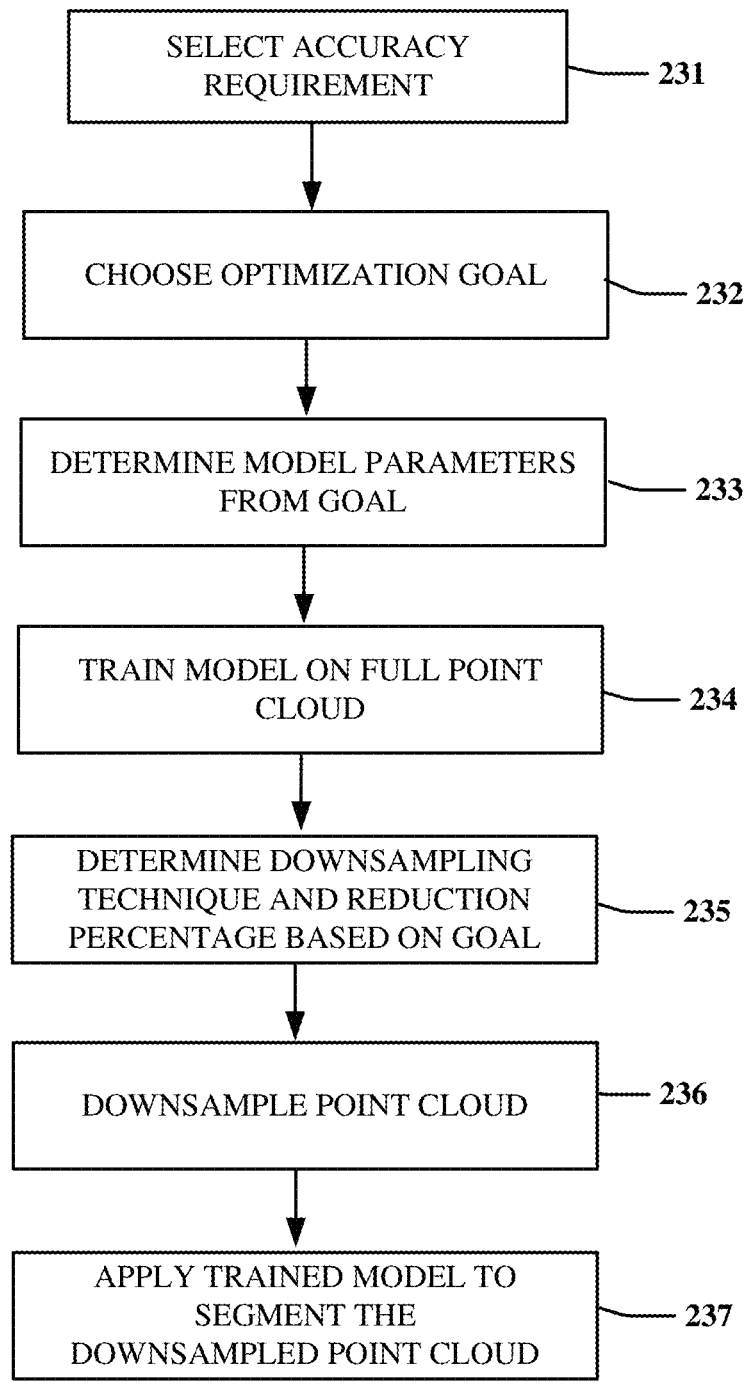
FIG. 2K depicts an illustrative embodiment of a method in accordance with various aspects described herein.

FIG. 2K depicts an illustrative embodiment of a method in accordance with various aspects described herein. As shown in FIG. 2K, the method 230 begins in step 231, where an accuracy requirement is selected for segmentation. For example, a 60% IoU accuracy target may be needed.

Next, in step 232, an optimization goal is selected. The optimization goal may be to achieve the greatest segmentation accuracy possible. Alternatively, the optimization goal may be to reduce memory usage or to seek the lowest computational overhead possible. In an embodiment, reduced memory usage or lowest computational overhead may be a requirement driven by the hardware environment in which the segmentation ML model is implemented.

Next, in step 233, ML model parameters are selected, given the optimization goal. The parameters include (1) the number of feature planes for each layer, m; (2) the style of the submanifold block (either VGG or ResNet) and (3) whether to use the optional submanifold blocks (either True or False). In an embodiment, selections are made based on tables illustrated in FIG. 2D, 2I or 2J, as appropriate.

Then, in step 234, the parameterized ML model is trained on one or more full point clouds. In an embodiment, the training activity may take place on hardware other than that used to segment point clouds in real time. In an embodiment, such training may be conducted on a supercomputer.

Next, in step 235, a downsampling technique and a data reduction percentage is determined based on the optimization goal. In an embodiment, the determination may be made based on tables illustrated in FIG. 2D, 2I or 2J, as appropriate.

Next, in step 236, the system downsamples the point cloud to create a downsampled point cloud using the downsampling technique and amount of data reduction percentage determined in step 235. In an embodiment, such downsampling may occur on a device in the field, such as a mobile phone or laptop, that comprises limited processing capability or memory size limitations. These limitations will be incorporated into the optimization goal considered in step 232.

Finally, in step 237, the system uses the trained ML model having the parameters selected in step 233 to perform segmentation on the downsampled point cloud to assign label(s) the points. In an embodiment, the system also assigns labels to other points in the full point cloud that were removed by the downsampling process of step 236. In an embodiment, object recognition is used to determine a brand of an object. Points of the recognized object can be labelled with a brand of goods associated with the object. The brand can be used for targeted advertising purposes. In another embodiment, a simplified model maybe utilized that applies a hashing technique to speed the reduction and pruning of point cloud components. For example, if a similar structure of an object (e.g., a table leg) is geometrically hashed into a look-up code, conclusions about how to simplify this leg can be reused thereby avoiding additional computational evaluation with other models. This functionality complements existing prior art that uses simplified (non-machine learned) methods to prune and optimize a model.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, in another embodiment, the process steps described in FIG. 2K may be iteratively repeated to match a user-determined level of quality. For example, simplification may go through one or more stages where the user identifies regions of the final down sampled point cloud that should receive more detail. The user may want more detail or understand why parts of the model were eliminated. Other model acceleration techniques could be employed, such as parameter quantization and network pruning and sharing. Parameter quantization reduces the number of bits to represent each weight. Parameter quantization can significantly reduce the memory and computation overhead in the trade of a slight loss of accuracy. Network pruning and sharing has been used to reduce the network complexity and to address the overfitting issue. Pruning can be applied to remove redundant connections or neurons, while weight sharing groups connections into hash buckets that share the same weights.

Referring now to FIG. 3, a block diagram is shown illustrating an example, non-limiting embodiment of a virtualized communication network 300 in accordance with various aspects described herein. A virtualized communication network is presented that can be used to implement some or all of the subsystems and functions of system 100, the subsystems and functions of a machine-learning model and method 230 presented in FIGS. 1, 2A, 2B, 2C, 2D, 2E, 2F, 2G, 2H, 2I, 2K and 3. For example, virtualized communication network 300 can facilitate in whole or in part downsampling a point cloud and segmenting the down-sampled point cloud using a machine-learning model.

A cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, network element 150 (shown in FIG. 1), is a traditional network element like an edge router that can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In some cases, a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across several servers—each of which adds a portion of the capability, and overall which creates an elastic function with higher availability than its former monolithic version. These virtual network elements 330, 332, 334, etc. can be instantiated and managed using an orchestration approach like those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. Network workloads may have applications distributed across the virtualized network function cloud 325 and cloud computing environment 375 and in the commercial cloud or might simply orchestrate workloads supported entirely in NFV infrastructure from these third-party locations.

Figure 4:
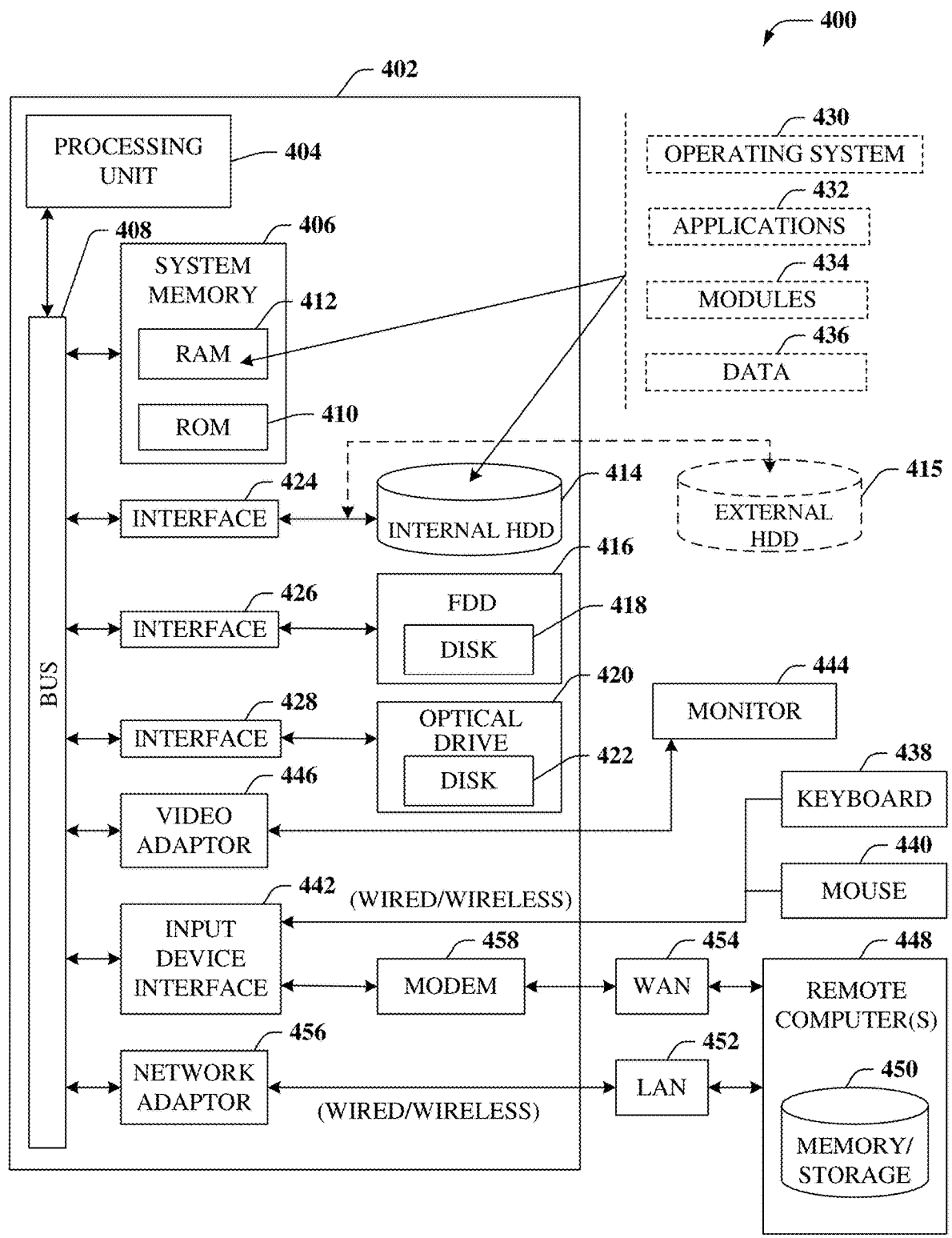
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 suitable for implementing the various embodiments of the subject disclosure. Computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part downsampling a point cloud and segmenting the downsampled point cloud using a machine-learning model.

Generally, program modules comprise routines, programs, components, data structures, etc., that perform tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (i.e., HDD 414, e.g., EIDE, SATA), which HDD 414 can also be configured for external use in a suitable chassis (External HDD 415), a magnetic floppy disk drive (i.e., FDD 416), (e.g., to read from or write to a removable diskette 418) and an optical disk drive 420, (e.g., reading a CD-ROM disk 422 or, to read from or write to other high capacity optical media such as the DVD). The HDD 414, FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

Several program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (i.e., LAN 452) and/or larger networks, e.g., a wide area network (i.e., WAN 454). Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology like that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance like the basic 10BaseT wired Ethernet networks used in many offices.

Figure 5:
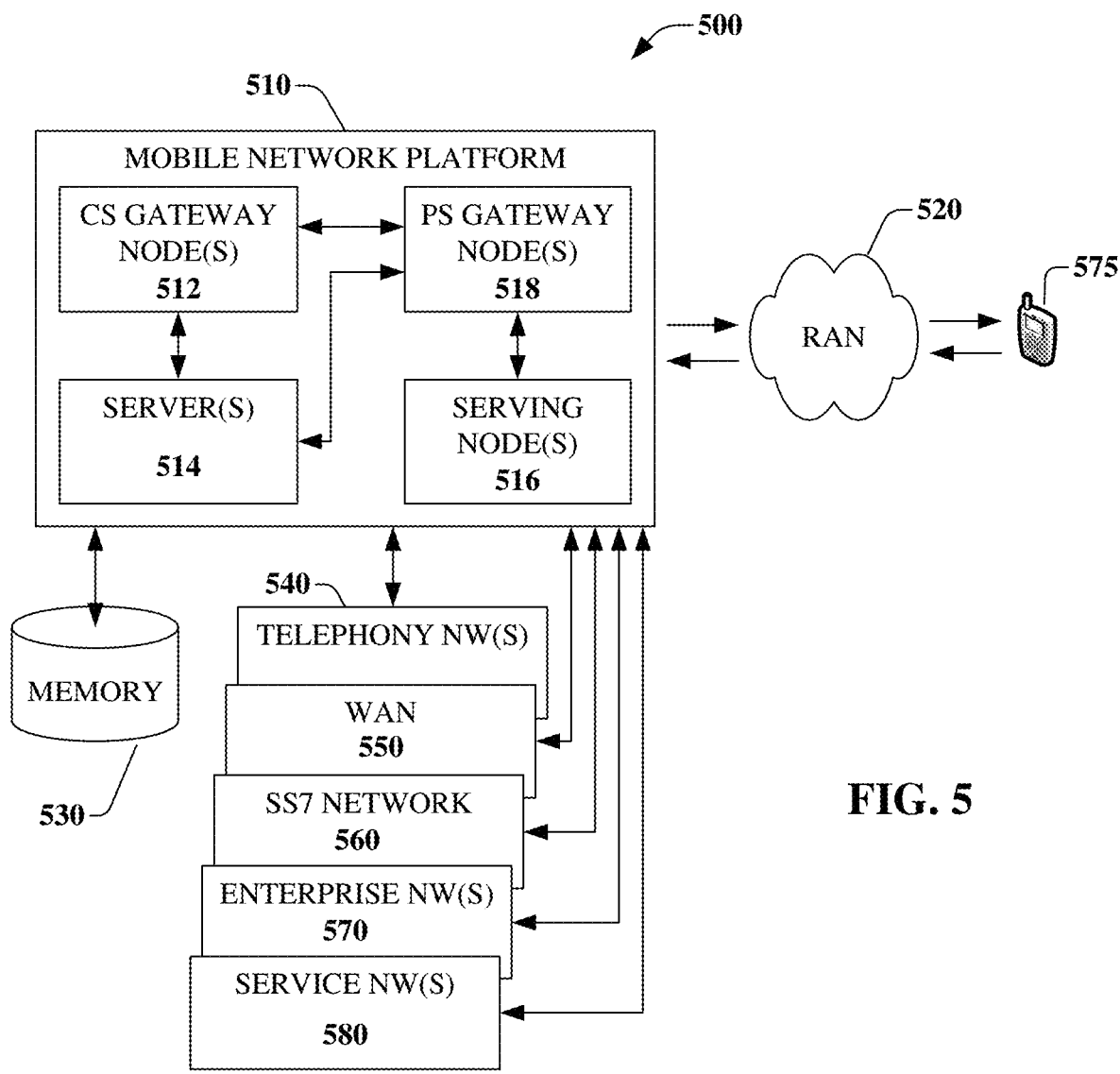
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, mobile network platform 510 can facilitate in whole or in part downsampling a point cloud and segmenting the downsampled point cloud using a machine-learning model. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (i.e., WANs 550), enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WANs 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WANs 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
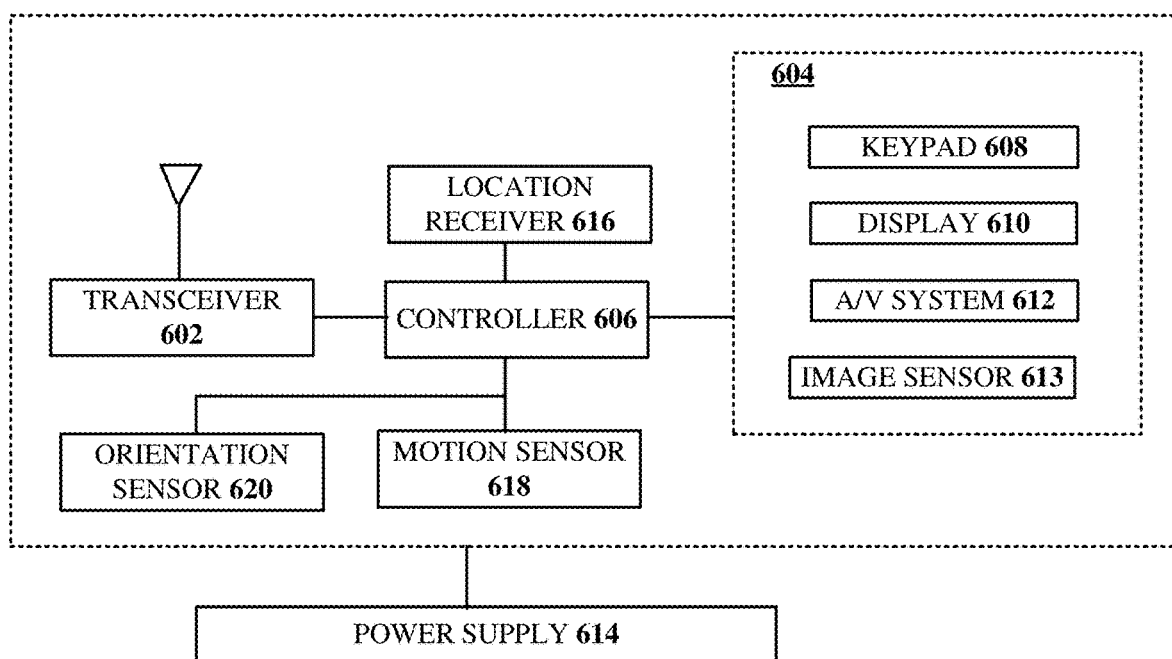
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, the plurality of audio/video display devices 144 or other client devices for communication via either communications network 125. For example, communication device 600 can facilitate in whole or in part downsampling a point cloud and segmenting the downsampled point cloud using a machine-learning model.

The communication device 600 can comprise a transceiver 602 that can be wireline and/or wireless, a user interface (i.e., UI 604), a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a keypad 608 that can be depressible or touch-sensitive, with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from a machine-readable medium having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. Yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, machine-readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all the features described with respect to an embodiment can also be utilized.

What is claimed is:

1. A device, comprising:
a processing system including a processor; and
a memory that stores executable instructions that, when executed by the processing system, facilitate performance of operations, the operations comprising:
downsampling a full point cloud to obtain a downsampled point cloud, wherein the downsampling reduces a data size of the full point cloud;
using a machine-learning model to assign labels for segmentation and object identification to points in the downsampled point cloud, wherein the machine-learning model is trained on the full point cloud, and wherein the machine-learning model is a submanifold sparse convolutional network; and
selecting model parameters for the machine-learning model, wherein the model parameters comprise a number of feature planes for each layer of a plurality of layers, a style of submanifold block and whether to use optional submanifold blocks.

2. The device of claim 1, wherein the downsampling uses grid simplification.

3. The device of claim 2, wherein the downsampled point cloud comprises 20 to 60 percent of points in the full point cloud to reduce memory usage and computational overhead.

4. The device of claim 2, wherein the downsampled point cloud comprises 63 to 87 percent of points in the full point cloud to improve segmentation accuracy.

5. The device of claim 1, wherein the operations further comprise selecting a downsampling technique and a downsampling reduction percentage to reduce memory usage while meeting a required segmentation accuracy.

6. The device of claim 1, wherein the operations further comprise selecting a downsampling technique and a downsampling reduction percentage to reduce computational overhead while meeting a required segmentation accuracy.

7. The device of claim 1, wherein the processing system comprises a plurality of processors operating in a distributed computing environment, wherein the labels comprise a brand associated with the object, and wherein the brand is used for targeted advertising.

8. A non-transitory machine-readable medium, comprising executable instructions that, when executed by a processing system including a processor, facilitate performance of operations, the operations comprising:
receiving a machine-learning model trained on a full point cloud, wherein the machine-learning model is a submanifold sparse convolutional network;
selecting model parameters for the machine-learning model, wherein the model parameters comprise a number of feature planes for each layer of a plurality of layers, a style of submanifold block and whether to use optional submanifold blocks;
downsampling the full point cloud to a downsampled point cloud using a downsampling technique; and
segmenting the downsampled point cloud using the machine-learning model having the model parameters to assign labels to points in the downsampled point cloud.

9. The non-transitory machine-readable medium of claim 8, wherein the downsampling technique is grid simplification.

10. The non-transitory machine-readable medium of claim 9, wherein the downsampled point cloud comprises 20 to 60 percent of points in the full point cloud to reduce memory usage and computational overhead.

11. The non-transitory machine-readable medium of claim 9, wherein the downsampled point cloud comprises 63 to 87 percent of points in the full point cloud to improve segmenting accuracy.

12. The non-transitory machine-readable medium of claim 8, wherein the operations further comprise selecting the downsampling technique and a downsampling reduction percentage to reduce memory usage while meeting a required segmentation accuracy.

13. The non-transitory machine-readable medium of claim 8, wherein the operations further comprise selecting the downsampling technique and a downsampling reduction percentage to reduce computational overhead while meeting a required segmentation accuracy.

14. The non-transitory machine-readable medium of claim 13, wherein the model parameters comprise a number of feature planes for each layer, a style of submanifold block and whether to use optional submanifold blocks.

15. The non-transitory machine-readable medium of claim 8, wherein the processing system comprises a plurality of processors operating in a distributed computing environment.

16. A method, comprising:
downsampling, by a processing system including a processor, a full point cloud to a downsampled point cloud using a downsampling technique; and
segmenting, by the processing system, the downsampled point cloud using a submanifold sparse convolutional network having model parameters to assign labels to points in the downsampled point cloud, wherein the downsampling either reduces a memory usage, reduces a computational overhead, improves accuracy, or a combination thereof, and wherein the model parameters comprise a number of feature planes for each layer of a plurality of layers, a style of submanifold block and whether to use optional submanifold blocks.

17. The method of claim 16, comprising:
selecting, by the processing system, the model parameters for the submanifold sparse convolutional network, the downsampling technique, and a downsampling reduction percentage to achieve a required segmentation accuracy.

18. The method of claim 16, wherein a label of the labels pertains to a brand of goods associated with an object represented by the downsampled point cloud.

19. The method of claim 16, comprising:
applying, by the processing system, parameter quantization to reduce a number of bits associated with the downsampled point cloud; and
applying, by the processing system, network pruning and sharing techniques to reduce network complexity and to address overfitting.

20. The method of claim 16, wherein the downsampling is applied in stages, the method further comprising:
receiving, by the processing system, a user input that identifies regions of the downsampled point cloud that should receive more detail in a first stage of the stages; and
enhancing, by the processing system and based on the receiving of the user input, detail of the regions in a second stage of the stages.

* * * * *